April 2, 1968  R. A. LARSON ET AL  3,376,181
METHOD AND APPARATUS FOR BLOWING PLASTIC LINER IN CONTINUOUSLY
FORMED TUBES HAVING LONGITUDINAL SEAM
Filed July 31, 1963  2 Sheets-Sheet 1

INVENTORS
RALPH A. LARSON, CURTIS E. MAIER
& RONALD L. MILLAR

BY Mason, Porter, Diller & Stewart
ATTORNEYS

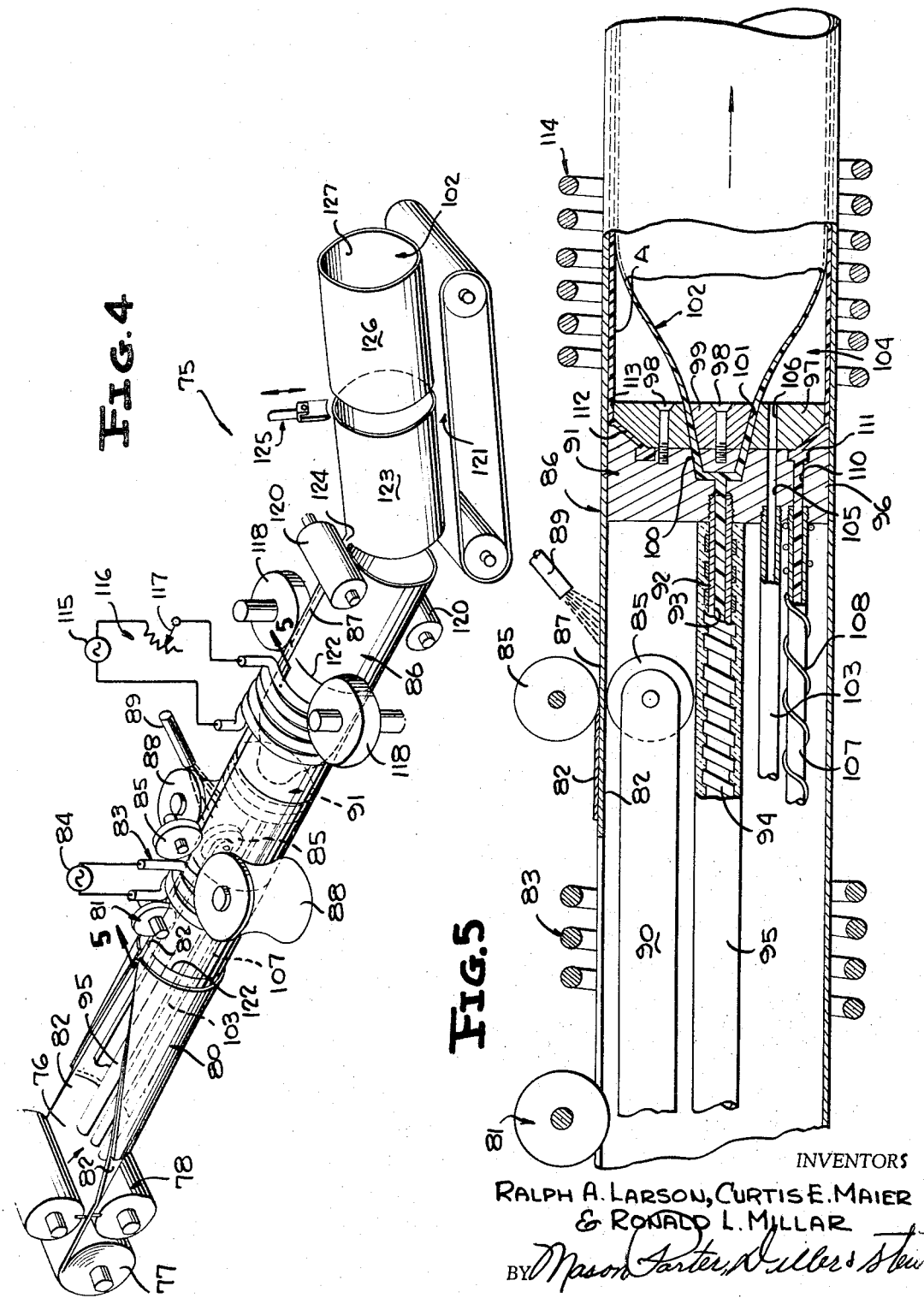

3,376,181
METHOD AND APPARATUS FOR BLOWING PLASTIC LINER IN CONTINUOUSLY FORMED TUBES HAVING LONGITUDINAL SEAM
Ralph A. Larson, Michigan City, Ind., Ronald L. Millar, Elmhurst, Ill., and Curtis E. Maier, Koenigstein, Germany, assignors to Continental Can Company, Inc., New York, N.Y., a corporation of New York
Filed July 31, 1963, Ser. No. 298,854
13 Claims. (Cl. 156—203)

This invention relates to novel apparatus for forming longitudinally seamed tubes and at the same time extruding a tubular lining into the interiors of the seamed tubes.

In the can making industry it is conventional to form can bodies from a longitudinally seamed tube by cutting the seamed tube into discrete lengths to form individual can bodies therefrom. At times it is necessary or desirable to provide these can bodies with a lining when a product packaged in cans made from these can bodies would adversely affect the material from which the can bodies are fabricated. A suitable lining would, of course, render the material of the can bodies impervious to a packaged material. Heretofore longitudinally seamed tubes were lined or coated by dipping or immersing operation which required considerable labor, was time consuming and necessarily wastes much of the coating or lining material.

Another method of lining a continuously seamed tube involves spraying an enamel against the tube interior and subsequently subjecting the enamel to heat and to cure the same and produce a solid film or lining. Such enamels are either solvent thinned to a low viscosity or utilize two liquid components which necessitate the curing operation.

An object of this invention is to provide a novel method and apparatus for forming longitudinally seamed tubes from a continuous strip of material and at the same time provide the seamed tubes with an internal tubular lining which is extruded into the interior of the seamed tubes during the fabrication thereof.

Another object of this invention is to provide novel apparatus for lining a simultaneously formed, longitudinally seamed tube including an extrusion nozzle in a seamed tube, the extrusion nozzle including an extrusion orifice for forming a tubular lining from suitable lining material and means for urging or distending the formed tubular lining radially outwardly with respect to the extrusion nozzle into contact with the interior of the seamed tube.

Another object of this invention is to provide novel apparatus of the type immediately above described, and in addition, to provide the extrusion nozzle with conduit means in communication with a source of adhesive for applying the adhesive to the interior of the seamed tube for effectively adhering the distended tubular lining to the seamed tube.

Still another object of this invention is the provision of novel apparatus for extruding a tubular lining into the interior of a simultaneously formed seamed tube by supporting an extrusion nozzle internally of the seamed tube and in communication with a source of flowable lining material, the extrusion nozzle including an extrusion orifice for forming a tubular lining from the flowable lining material, a source of vacuum, the source of vacuum being in communication with an area or chamber between the tubular lining and the seamed tube for urging the formed tubular lining outwardly into contact with the interior of the seamed tube, and means for coating the interior of the seamed tube with an adhesive for effectively adhering the tubular lining to the seamed tube.

Another object of this invention is to provide a novel device for extruding a tubular lining internally of a longitudinally seamed tube, the device including an extrusion nozzle supported by an extension of an extruder, the extrusion nozzle including an orifice through which flowable lining material from the extruder is formed into a tubular lining, first conduit means in communication between a source of vacuum and a vacuum port opening into a chamber between a tubular lining and the seamed tube for urging the formed tubular lining radially outwardly into contact with the interior of the seamed tube, and second conduit means in communication between a supply of adhesive material and an orifice opening into the chamber between the tubular lining and the seamed tube for applying or coating the adhesive material against the interior of the seamed tube.

Another object of this invention is to provide a novel device of the character above described, and in addition, to provide heating means for controlling the temperature of the adhesive and a reciprocating cutter mechanism for severing the lined longitudinally seamed tube into discrete can bodies.

Another object of this invention is to proivde a novel method of extruding a tubular lining into a simultaneously formed longitudinally seamed tube by progressively forming a strip of material into a seamed tube, applying an adhesive coating to an interior surface of the seamed tube and forming a partial vacuum in a chamber between the tube and an extruded tubular lining to distend the lining into adhesive contact with the interior of the seamed tube.

With the above and other objects in view that will herein after appear, the nature of the invention will be more clearly understood by reference to the following detailed description, the appended claims and the several views illustrated in the accompanying drawings.

In the drawings:

FIGURE 1 is a diagrammatic view of an apparatus constructed in accordance with this invention for simultaneously forming a seamed tube, lining the seamed tube and severing the same to form discrete can bodies, and illustrates a continuous strip of material being formed to a tubular configuration, a source of vacuum, a source of adhesive material, an extruder having a portion supporting an extrusion nozzle internally of the seamed tube, a drive mechanism for linearly advancing the seamed tube and a cutter mechanism for severing the seamed tube into discrete lengths.

FIGURE 4 is a diagrammatic view of an apparatus for simultaneously forming a longitudinally seamed tube, lining the same and cutting the seamed into discrete lengths; and illustrates a continuous strip of metallic material, forming means arranged along a predetermined path for forming the strip material into a tube, means for welding edge portions of the strip material, an extrusion nozzle supported internally of the seamed tube and a mechanism for severing the lined metallic tube into discrete can body lengths.

FIGURE 5 is an enlarged fragmentary sectional view taken along line 5—5 of FIGURE 4, and illustrates three conduits secured to the extrusion nozzle and a tubular lining being extruded by the extrusion nozzle and urged radially outwardly into contact with an adhesive-coated interior surface of the seamed metallic tube.

Figure 1:
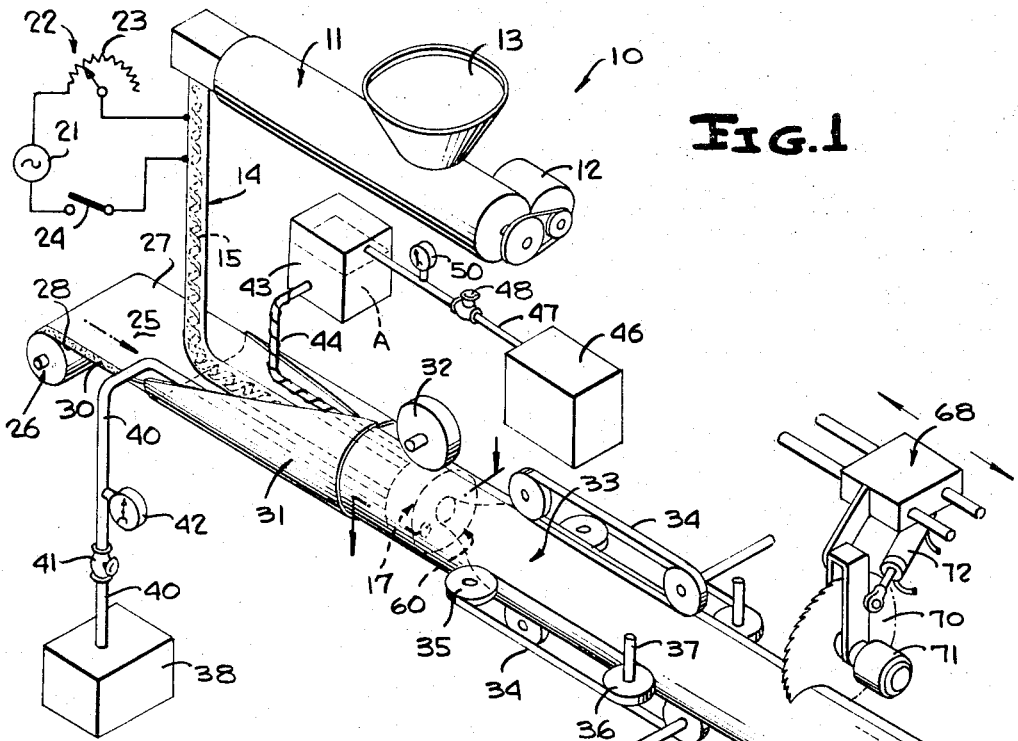
Figure 2:
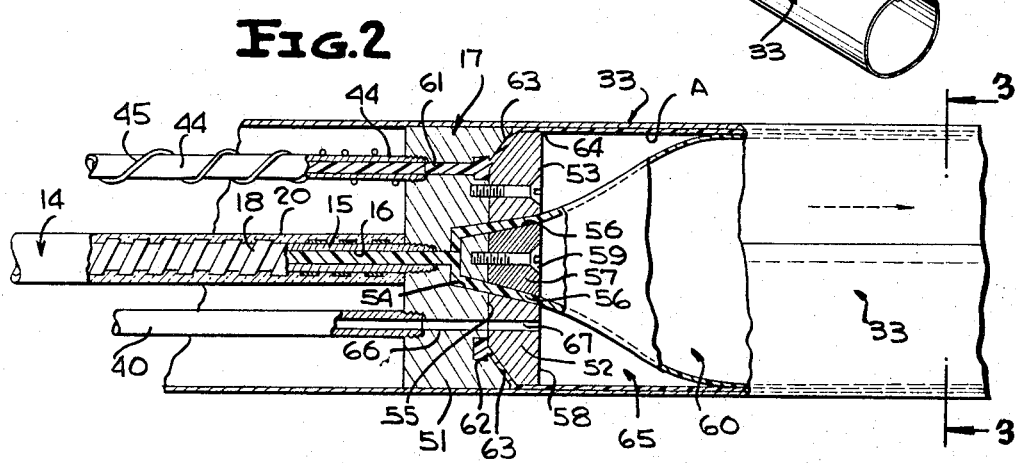
FIGURE 2 is an enlarged fragmentary sectional view taken along line 2—2 of FIGURE 1 and illustrates an adhesive conduit, a vacuum conduit, and a conduit forming an extension of the extruder secured to the extrusion nozzle, and a tubular lining being extruded into the interior of the seamed tube.
Figure 3:
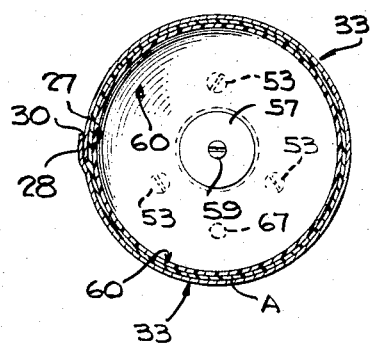
FIGURE 3 is a rotated cross-sectional view taken along line 3—3 of FIGURE 2, and illustrates the radial outward distending of the tubular lining as it leaves the extrusion nozzle and contacts the seamed tube.

Referring specifically to the drawings, an apparatus for simultaneously forming a longitudinally seamed tube and extruding a tubular lining therein is best illustrated in FIGURES 1 and 2 of the drawings and is generally designated by the reference numeral 10.

The apparatus 10 includes a conventional extruder 11 driven in a suitable manner by a drive mechanism 12 and fed through a hopper 13 communicating with the interior of the extruder 11. Extrudable plastic material, such as polyethylene, is supplied to the extruder 11 through the hopper 13. An insulated conduit 14 forms an extension of the extruder 11.

As is best illustrated in FIGURE 2 of the drawings, the insulated conduit 14 includes a conduit 15 having a bore 16 secured to an extrusion nozzle 17. A strip heater 18 encased in a thermal insulating jacket 20 surrounds the conduit 15 along the entire length thereof. The strip heater 18 is connected to a suitable source of alternating potential energy 21 (see FIGURE 1) by an electrical circuit 22. The electrical circuit 22 includes a variable potentiometer 23 and a switch 24.

A substantially continuous strip of resilient material 25 such as paper is unwound from a supply roll 26 in the direction of the broken arrow of FIGURE 1. The strip of material has a first longitudinal edge portion 27 and a second longitudinal edge portion 28 coated with a heat meltable adhesive 30.

A forming mechanism 31 gradually shapes the strip material 25 into a tube with the adhesively coated second longitudinal edge portion 28 in overlying relation to the first longitudinal edge portion 27. A freely rotatable heated sealing roll 32 melts the adhesive 30 to adhesively secure the longitudinal edge portions 27 and 28 together, thereby forming a longitudinally seamed tube 33.

A plurality of identical pulley belts 34 are each entrained about an identical idler pulley 35 and a drive pulley 36. A shaft 37 of each of the drive pulleys 36 is rotated by a suitable drive mechanism (not shown) to linearly advance the longitudinally seamed tube 33 along a predetermined path from left-to-right as viewed in FIGURE 1 of the drawings.

A suitable source of vacuum 38, such as a vacuum pump, is placed in fluid communication with the extrusion nozzle 17 by a vacuum conduit 40. An automatically regulated vacuum valve 41 in the vacuum conduit 40 regulates the amount of vacuum while a vacuum gauge 42 in the vacuum conduit 40 operates in a known manner to indicate the amount of vacuum.

A heated adhesive reservoir 43 is placed in communication with the extrusion nozzle 17 by a conduit 44. The adhesive A in the reservoir is preferably paraffin and a heating coil surrounding the conduit 44 maintains the paraffin in a flowable condition between the adhesive reservoir 43 and the extrusion nozzle 17. The adhesive or paraffin is urged through the conduit 44 by introducing compressed air into the reservoir 43 by means of an air compressor 46, a conduit 47 and a pressure regulating valve 48 which automatically controls the air pressure. A pressure gauge 50 in the conduit 47 indicates the amount of air pressure in the reservoir 43.

As is best illustrated in FIGURE 2 of the drawings, the extrusion nozzle 17 includes a first body portion 51 secured to a second body portion 52 by a plurality of identical screws 53. The first body portion 51 is threadably secured to the conduit 15 which forms an extension of the extruder 11 in a manner clearly illustrated in FIGURE 1. The bore 16 of the conduit or extruder extension 15 communicates with a plurality of bores 54 arranged circumferentially in the first body portion 51 of the extrusion nozzle 17. The circumferentially arranged bores 54 are separated from each other by thin ribs (not shown) which taper outwardly toward a face 55 of the first body portion 51. A continuous annular extrusion orifice 56 is formed between the second body portion 52 of the extrusion nozzle 17 and a third body portion 57 which is attached by a screw 59 to the first body portion 51. The extrusion orifice 56 opens through a vertical face 58 of the extrusion nozzle 17. Flowable lining material communicated to the extrusion nozzle 17 by the extruder extension 15 is extruded through the bores 54 and the annular extrusion orifice 56 to form a tubular lining 60 in the interior of the longitudinally seamed tube 33.

Adhesive is communicated from the adhesive reservoir 43 through the conduit 44 and a bore 61 into an annular chamber 62 formed in the face 55 of the first body portion 51. An annular groove 63 is provided between the body portions 51 and 52 of the extrusion nozzle 17 to place the annular chamber 62 in fluid communication with an annular groove or orifice 64 formed by the periphery of the second body portion 52 and the tube 33. Adhesive from the adhesive reservoir 43 passes through the conduit 44, the bore 61, the annular chamber 62, the annular groove 63 and the peripheral orifice 64 to coat the entire internal surface of the longitudinally seamed tube 33.

A chamber or area 65 between the exterior of the tubular lining 60 and the interior of the adhesively coated seamed tube 33 is placed under slight negative pressure by the source of vacuum 38 through the vacuum conduit 40, a bore or port 66 in the first body portion 51 and an aligned bore or port 67 in the second body portion 52 of the extrusion nozzle 17. The partial vacuum in the chamber 65 causes the tubular lining 60 to distend radially outwardly toward and into contact with the adhesively coated interior of the seamed tube 33. As the tubular lining 60 is distended, the wall thickness thereof is reduced as the linearly moving tube 33 draws the tubular lining 60 in the direction of the broken arrow of FIGURE 2. Thus the partial vacuum in the chamber 65 effects efficient adhering contact between the tubular lining 60 and the seamed tube 33 while the movement of the seamed tube 33 results in a "drawing" of the tubular lining 60 for producing a tubular lining of a substantially uniform wall thickness throughout.

A cutting mechanism or flying cutter 68 is reciprocally mounted in a conventional manner by means well known in the art. The flying cutter 68 includes a cutting blade 70 rotated by a motor 71 and reciprocated transversely of the lined seamed tube 33 by a piston mechanism 72.

The flying cutter 68 is synchronized in a well known manner with the speed at which the seamed tube 33 is travelling to cut the seamed tube into a plurality of discrete lengths to form lined can bodies.

Another apparatus for forming a longitudinally seamed tube, providing the seamed tube with an extruded tubular lining and severing the lined seamed tube into discrete can bodies is illustrated in FIGURES 4 and 5 of the drawings and is generally referred to by the reference numeral 75.

The apparatus 75 includes a strip of metal material 76 which is unwound from a coil 77 and fed between a pair of scoring rolls 78 which score the strip transversely thereof. The metallic strip of material 76 is fed from left-to-right as viewed in FIGURE 4 through a forming mechansim 80 which gradually forms the metallic strip 76 into a generally tubular configuration. A rotatable aligning roll 81 aligns longitudinal edge portions 82 of the metallic strip 76. The edge portions 82 are heated to welding temperature by an induction coil 83 surrounding the tubular contoured metallic strip 76 and supplied by an alternating source of potential energy 84. A pair of opposed pressure rolls 85 forge weld the longitudinal edge portions 82 of the metallic strip 76 to form a seamed tube 86 having a longitudinal seam 87. Prior to forge welding the seam 87, a pair of hour-glass forming rolls 88 urge the edge portions 82 into overlapping relationship, as is best illustrated in FIGURE 5, to form the welded seam 87. The lowermost pressure roll 81 of FIGURE 5 is journalled to an arm 90 which is supported in a conventional manner. After welding, the seam is preferably cooled or treated by a gas, or air emitted from a nozzle 89.

An extrusion nozzle 91 is supported internally of the longitudinally seamed tube 86 by a conduit 92 having a bore 93. The conduit 92 forms an extension of an extruder (not shown) in the same manner the conduit 15 forms an extension of the extruder 11 of FIGURE 1. An electrical strip heater 94 surrounds the conduit or extruder extension 92 and is encased in a thermal insulating jacket 95.

The extrusion nozzle 91 includes a first body portion 96 and a second body portion 97 secured together by a plurality of identical screws 98. A plurality of circumferentially arranged bores 100 in the first body portion 96 of the extrusion nozzle 91 are in communication between the bore 93 of the extruder extension 92 and a continuous annular extrusion orifice 101 formed between the second body portion 97 and a third body portion 99. The bores 100 and the extrusion orifice 101 correspond to the bores 54 and the extrusion orifice 56 of the extrusion nozzle 17 and a further description of these components is considered unnecessary for an understanding of this invention. The extrusion nozzle 91 extrudes a tubular lining 102 into the interior of the seamed metallic tube 86 in a manner identical to that described in the consideration of FIGURE 2.

A vacuum conduit 103 is placed in fluid communication with a chamber 104 between the seamed metallic tube 86 and the tubular lining 102 by axially aligned bores 105 and 106 in the respective first and second body portions 96 and 97 of the extrusion nozzle 91. The vacuum conduit 103 is in communication with a suitable source of vacuum, such as the vacuum pump 38 of FIGURE 1 of the drawings. The partial vacuum produced in the chamber 104 causes the tubular lining 102 to distend toward the interior surface of the seamed tube 86 as the seamed tube 86 is being linearly advanced in the direction of the broken arrow of FIGURE 5. The wall thickness of the tubular lining 102 is progressively reduced as the tubular lining is distended and in this manner a desired thin and substantially uniform wall thickness is achieved.

A conduit 107 heated by an electric coil 108 is secured to the first body portion 96 of the extrusion nozzle 91. The conduit 107 is in communication with a suitable source of adhesive material, preferably paraffin, which is applied to the entire interior surface of the seamed tube 86 through a bore 110, an annular chamber 111, an annular slot 112 and a peripheral groove 113 in the extrusion nozzle 91. The elements 110, 111, 112 and 113 of the extrusion nozzle 91 correspond to the components 61–64 of the extrusion nozzle 17 of FIGURE 2. An adhesive coating A is applied to the interior surface of the seamed tube 86 in the same manner as the adhesive coating A is applied to the interior surface of the longitudinally seamed tube 33, and a further discussion thereof is deemed unnecessary for a complete understanding of this invention.

During the extruding of the tubular lining 102 and the application of the adhesive coating A to the seamed tube 86, an induction coil 114 surrounding the seamed tube 86 heats the tube to a desirable temperature for achieving an efficient bond between the tubular lining 102 and the seamed tube 86. The induction coil 114 is energized by a suitable source of alternating potential energy 115 forming a part of an electrical circuit 116 which includes a variable potentiometer 117 (see FIGURE 4).

A pair of rolls 118 (FIGURE 4) are driven in a conventional manner to move the now tubular lined seamed tube 86 between a pair of opposed freely rotatable rolls 120 and toward a driven belt conveyor 121. The driven belt conveyor 121 is angularly related to the axis of the longitudinal tube 86. The angularly related conveyor belt mechanism 121 causes the seamed tube 86 to alter its axial path of travel causing the tube to break along each of the lines of severance 122 heretofore formed by the scoring rolls 78. The uppermost roll 120 of FIGURE 4, in effect, acts as a fulcrum about which the longitudinally seamed tube 86 tends to bend, thereby breaking at the score lines 122. Each tube portion 123 remains attached to the seamed tube 86 by a relatively small metallic area 124 of the seam 87. A reciprocating cutter 125 shears this metallic area 124 to form a can body 126 having an interior surface lined by a portion 127 of the tubular lining 102.

At this time, it is pointed out that variations in the apparatus 10 and 75 will be apparent to those having knowledge of this invention and these variations are included in this disclosure. For example, the extruder extensions 15 and 92 as well as the conduits 44 and 107 could be surrounded by a steam heated jacket rather than by electrical heating elements. Where certain adhesives are employed which do not necessitate the application of heat to the seamed tube 86 to effect optimum bonding thereof to the tubular lining 102, the induction coil 114 may be eliminated.

Instead of merely coating the longitudinal edge portion 28 of the strip of material 25 with an adhesive 30, the entire surface of the strip of material 25 can be coated with a heat meltable adhesive such as paraffin which will be melted by contact by the hot plastic lining. By so coating the entire surface of the strip of material 25, the adhesive reservoir 43 and the components associated therewith may, under certain conditions, be eliminated.

Other variations may be made in the apparatus disclosed herein without departing from the spirit and scope of this invention as defined in the appended claims.

We claim:

1. A method of extruding a tubular lining into a longitudinally seamed tube comprising the steps of providing a source of flowable lining material, extruding the lining material in tubular form into the interior of the seamed tube, applying an adhesive coating to the entire interior surface of the seamed tube, and pneumatically expanding the tubular liner into contact with the adhesively coated interior surface of the seamed tube.

2. A method of extruding a tubular lining to a longitudinally seamed tube during the fabrication of the seamed tube comprising the steps of advancing a strip of material along a predetermined path, progressively forming the strip of material into a tube with the longitudinal edges thereof in contact, seaming the longitudinal edges of the seamed tube, extruding a tubular lining into the interior of the seamed tube, applying an adhesive coating to an interior surface of the seamed tube and forming a partial vacuum in a chamber between the seamed tube and the tubular lining thereby expanding the tubular lining into adhesive contact with the interior of the seamed tube.

3. The method of extruding a tubular lining into a longitudinally seamed tube as defined in claim 2 including the steps of partially transversely scoring the strip of material prior to the formation of the seamed tube and heating the seamed tube during the expansion of the tubular lining to effectively adhere the tubular lining to the seamed tube.

4. Apparatus particularly adapted for lining a simultaneously formed longitudinally seamed tube comprising a source of strip material, means for advancing the strip material along a predetermined path, forming means adjacent the predetermined path for directing longitudinal edges of the strip material into edge contact, means for securing the longitudinal edges to form a longitudinally seamed tube, an extrusion nozzle supported coaxially of said seamed tube, means placing the extrusion nozzle in communication with a source of flowable lining material, said extrusion nozzle including an extrusion orifice adapted to form a tubular lining from the lining material, means placing the extrusion nozzle in communication with a source of adhesive, said extrusion nozzle further including orifice means for applying the adhesive against the interior of the seamed tube, and means for urging the formed tubular lining radially outwardly into contact with the adhesive on the interior of the seamed tube thereby lining the tube with the flowable lining material.

5. Apparatus particularly adapted for lining a simultaneously formed longitudinally seamed tube comprising a source of strip material, means for advancing the strip material along a predetermined path, forming means adjacent the predetermined path for directing longitudinal edges of the strip material into edge contact, means for securing the longitudinal edges to form a longitudinally seamed tube, an extrusion nozzle supported coaxially of said seamed tube, means placing the extrusion nozzle in communication with a source of flowable lining material, said extrusion nozzle including an extrusion orifice adapted to form a tubular lining from the lining material, means for urging the formed tubular lining radially outwardly into contact with the interior of the seamed tube thereby lining the tube with the flowable lining material, and said urging means includes a source of vacuum in communication with an area between the tubular lining and seamed tube.

6. Apparatus particularly adapted for lining a simultaneously formed longitudinally seamed tube comprising a source of strip material, means for advancing the strip material along a predetermined path, forming means adjacent the predetermined path for directing longitudinal edges of the strip material into edge contact, means for securing the longitudinal edges to form a longitudinally seamed tube, an extrusion nozzle supported coaxially of said seamed tube, means placing the extrusion nozzle in communication with a source of flowable lining material, said extrusion nozzle including an extrusion orifice adapted to form a tubular lining from the lining material, a source of vacuum in communication with a chamber between the tubular lining and the seamed tube for urging the formed tubular lining radially outwardly into contact with the interior of the seamed tube, a supply of adhesive material, conduit means placing the supply of adhesive material in communication with said chamber through an adhesive applying orifice in the extrusion nozzle and means for cutting the lined seamed tube into discrete tubular bodies.

7. The apparatus as defined in claim 6 wherein said source of strip material is metal and means are provided for heating the seamed tube beyond the extrusion nozzle for effectively adhering the tubular lining to the seamed metal tube.

8. The apparatus as defined in claim 7 wherein means are provided for partially transversely scoring the strip of metal material, said predetermined path includes an angular portion beyond the extrusion nozzle for causing severance of the transversely scored portions of the seamed metal tube and the cutting means includes a blade adapted to cut the unscored portions of the seamed metal tube adjacent the transversely scored portions thereof to form the discrete tubular bodies.

9. Apparatus particularly adapted for lining a simultaneously formed longitudinally seamed tube comprising a source of strip material, means for advancing the strip material along a predetermined path, forming means adjacent the predetermined path for directing longitudinal edges of the strip material into edge contact, the strip material being paperstock material having heat sealable material along at least one longitudinal edge thereof, means for securing the longitudinal edges to form a longitudinally seamed tube, said securing means being a heated sealing roll adjacent the predetermined path in cooperative relationship with said at least one longitudinal edge of the strip material, an extrusion nozzle supported coaxially of said seamed tube, means placing the extrusion nozzle in communication with a source of flowable lining material, said extrusion nozzle including an extrusion orifice adapted to form a tubular lining from the lining material, a source of vacuum in communication with a chamber between the tubular lining and the seamed tube for urging the formed tubular lining radially outwardly into contact with the interior of the seamed tube, a supply of adhesive material, conduit means placing the supply of adhesive material in communication with said chamber through an adhesive applying orifice in the extrusion nozzle and means for cutting the lined seamed tube into discrete tubular bodies.

10. A device adapted to form a tubular lining internally of a longitudinally seamed tube comprising an extrusion nozzle, an extrusion orifice in the extrusion nozzle, a bore in communication with the extrusion orifice adapted to communicate flowable lining material from an extruder through the extrusion orifice to form a tubular lining, said extrusion nozzle including first means for urging the formed tubular lining radially outwardly with respect to the extrusion nozzle, second means for applying an adhesive to the interior of a simultaneously formed exterior longitudinally seamed tube, said first means includes a conduit in communication between a source of vacuum and a vacuum port opening through the extrusion nozzle radially outwardly of the extrusion orifice.

11. A device adapted to form a tubular lining internally of a longitudinally seamed tube comprising an extrusion nozzle, an extrusion orifice in the extrusion nozzle, a bore in communication with the extrusion orifice adapted to communicate flowable lining material from an extruder through the extrusion orifice to form a tubular lining; said extrusion nozzle including first means for urging the formed tubular lining radially outwardly with respect to the extrusion nozzle, second means for applying an adhesive to the interior of a simultaneously formed exterior longitudinally seamed tube, said second means includes a conduit in communication between a supply of adhesive material and an adhesive applying orifice opening through the extrusion nozzle radially outwardly of the vacuum port.

12. A device adapted to form a tubular lining internally of a longitudinally seamed tube comprising an extrusion nozzle, an extrusion orifice in the extrusion nozzle, a bore in communication with the extrusion orifice adapted to communicate flowable lining material from an extruder through the extrusion orifice to form a tubular lining, said extrusion nozzle including first means for urging the formed tubular lining radially outwardly with respect to the extrusion nozzle, second means for applying an adhesive to the interior of a simultaneously formed exterior longitudinally seamed tube, said first means includes a conduit in communication between a source of vacuum and a vacuum port opening through the extrusion nozzle radially outwardly of the extrusion orifice, said second means includes a conduit in communication between a supply of adhesive material and an adhesive applying orifice opening through the extrusion nozzle radially outwardly of the vacuum port.

13. A device adapted to form a tubular lining internally of a longitudinally seamed tube comprising an elongated tubular extruder extension having a first end adapted to be connected to an extruder, a second end of the extruder extension having an extrusion nozzle secured thereto, a first tubular conduit arranged in the extruder extension and secured to the extrusion nozzle, and extrusion orifice in the extrusion nozzle, said first tubular conduit and extrusion orifice being in communication whereby flowable lining material is adapted to be communicated from an extruder through the first tubular conduit and the extrusion orifice to form a tubular lining, a second tubular conduit secured to said extrusion nozzle, a port in said extrusion nozzle in communication with said second tubular conduit and opening radially outwardly of said extrusion nozzle, said second tubular conduit being adapted for connection with a source of vacuum whereby the tubular lining is urged radially outwardly with respect to said extrusion orifice, a third conduit secured to said extrusion nozzle, an adhesive applying orifice in communication with the last mentioned orifice, and said adhesive applying orifice opening outwardly along a periphery of said extrusion nozzle.

References Cited

UNITED STATES PATENTS

| | | | |
|---|---|---|---|
| 2,958,364 | 11/1960 | Thompson | 156—201 |
| 2,570,259 | 10/1951 | McKinley | 156—143 |
| 3,207,651 | 9/1965 | Hood et al. | 156—466 |
| 2,695,255 | 11/1954 | Avery | 156—294 X |
| 2,873,227 | 2/1959 | Olson et al. | 156—294 X |
| 2,934,130 | 4/1960 | Lane et al. | 156—466 X |

EARL M. BERGET, *Primary Examiner.*

H. R. EPSTEIN, *Assistant Examiner.*